United States Patent

[11] 3,599,549

[72] Inventor Emile Jean Diuzet
Meudon, France
[21] Appl. No. 720,657
[22] Filed Apr. 11, 1968
[45] Patented Aug. 17, 1971
[73] Assignee Societe Industrielle Des Nouvelles Techniques Radioelectriques Et DeL' Electronique Francaise (Sintra)
Asnieres (Hauts de Seine), France
[32] Priority Apr. 13, 1967
[33] France
[31] 102,658

[54] IMAGE AND SOUND TRACKS SUPPORTS, RECORDING APPARATUS AND APPARATUS FOR READING SAID TRACKS
16 Claims, 16 Drawing Figs.

[52] U.S. Cl. .......... 95/12, 353/19, 352/37
[51] Int. Cl. .......... G03b 31/06
[50] Field of Search .......... 95/12; 353/15, 19; 352/37

[56] References Cited

UNITED STATES PATENTS

| | | | |
|---|---|---|---|
| 2,925,753 | 2/1960 | Schwartz .......... | 353/19 |
| 3,439,598 | 4/1969 | Weitzner .......... | 95/12 |

*Primary Examiner*—John M. Horan
*Attorney*—Karl W. Flocks

ABSTRACT: The invention relates to a film presenting a series of sound tracks and a series of images. Each sound track is a spiral lodged between two concentric circles and each image is placed inside the smallest circle of a sound track. The invention also refers to an apparatus for the optical recording of such sound tracks and images. It comprises a light modulator, means for effecting the two movements capable of generating a spiral, and recording means. The invention also concerns an apparatus for the optical reading of such sound tracks in spiral. It comprises an optical outfit of which at least one of the elements is subjected to a movement resulting from a movement of rotation and a rectilinear movement.

Inventor:
Emile Jean Dieuzet
By
Karl W. Flocks
Attorney

IMAGE AND SOUND TRACKS SUPPORTS, RECORDING APPARATUS AND APPARATUS FOR READING SAID TRACKS

The present invention has for object image and sound track supports and apparatus for recording and reading said tracks.

Supports are known which are both transparency holders and sound record holders, the record comprising a sound recording device accompanying or commenting the image of the transparency.

Films are also known in which separate portions of sound recording are disposed between separate cinematographic images.

The present invention relates, as new industrial products, to transparent supports comprising both, at least one image and a sound track in which the sound track is a spiral included between two concentric circles and the image is advantageously disposed inside the smallest circle.

The transparent support may be a film comprising a series of sound tracks in spiral form and a series of images disposed inside the spirals, the image corresponding to a sound track being offset relative to said sound track.

The invention also concerns an optical recording apparatus for such sound tracks on a transparent support.

This invention also concerns an optical recording apparatus for such sound tracks on a transparent support.

This apparatus comprises a light modulator and a means communicating to the modulated rays at least one of the two movements capable of generating the spiral above a plane of a transparent support.

The invention finally relates to an apparatus for optically reading sound tracks in spiral form, the optical apparatus of which is mounted on a support simultaneously receiving the two movements permitting a scanning of the outline of the spiral of each sound track and its reading by a photoelectric cell.

Other characteristics and advantages will become apparent from the following description on conjunction with the accompanying drawings in which.

Figure 14:
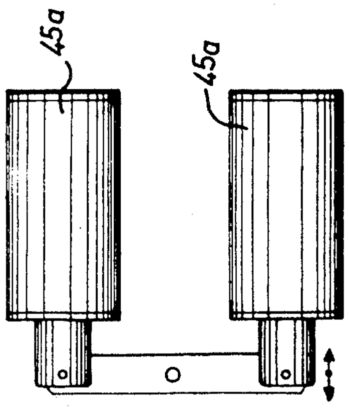
Figure 13:
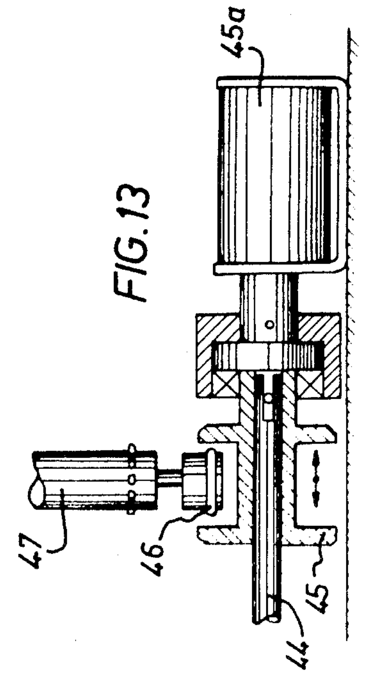

FIGS. 13 and 14 partially show a film feed device.

Figure 15:
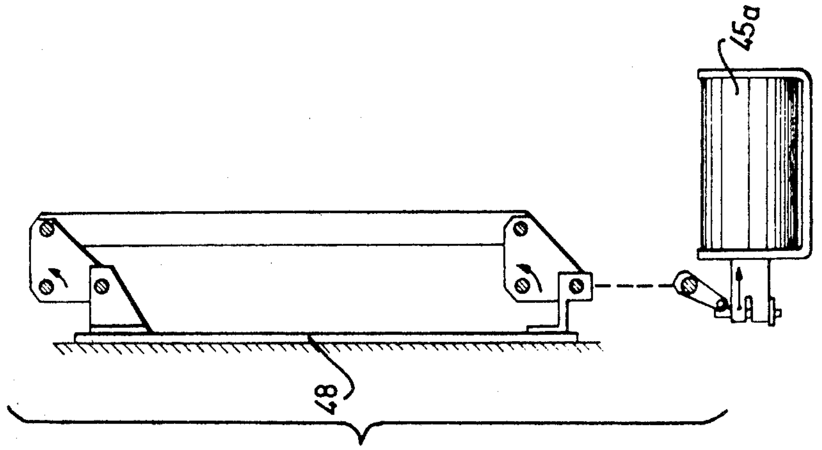

FIG. 15 is a view in elevation of a film-pressing device.

Figures 10, 16:
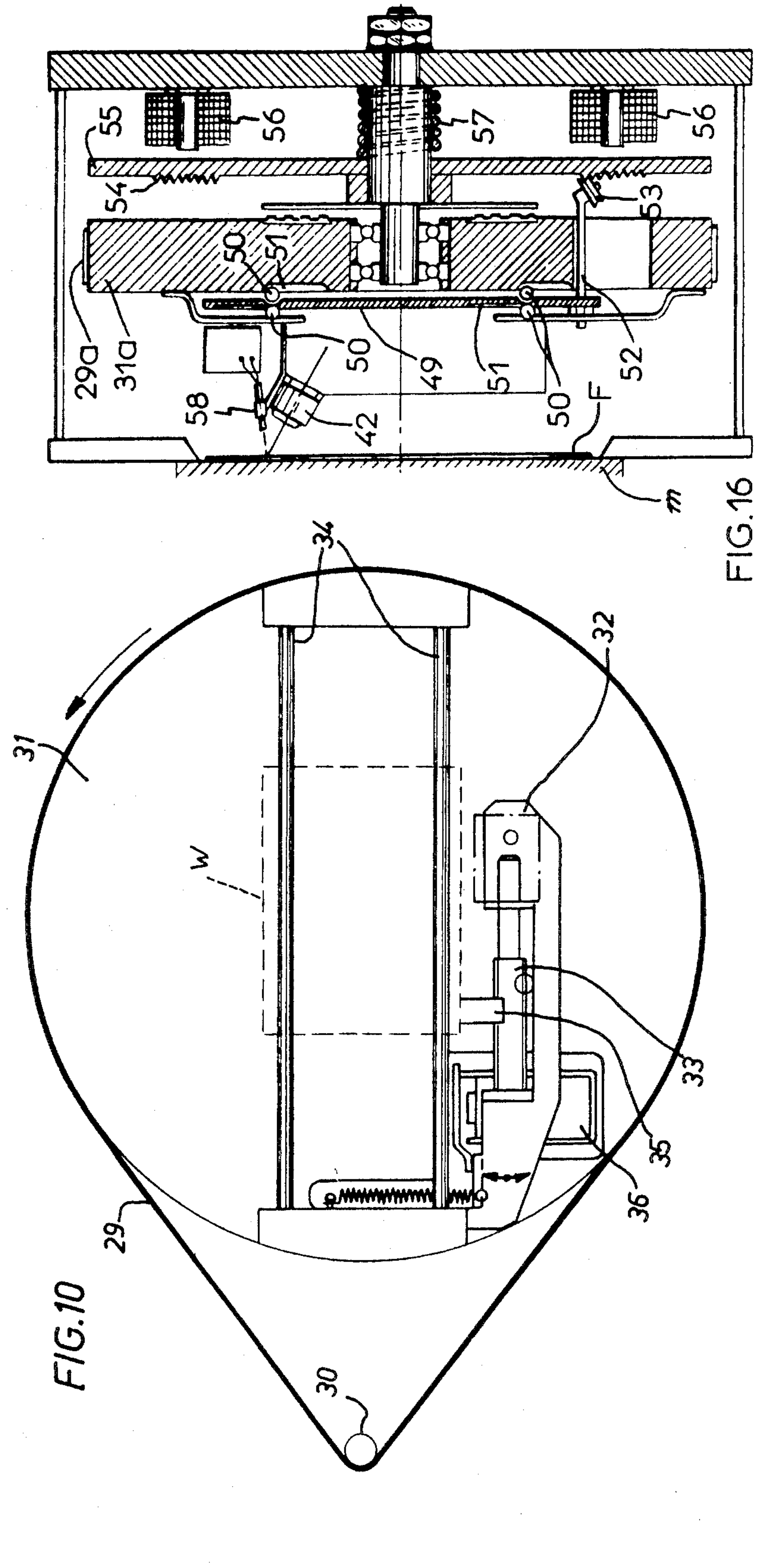
FIG. 10 is a plan view of a reading apparatus according to the invention.

FIG. 16, finally, shows a modified form of the reading device according to the invention.

Figure 1:
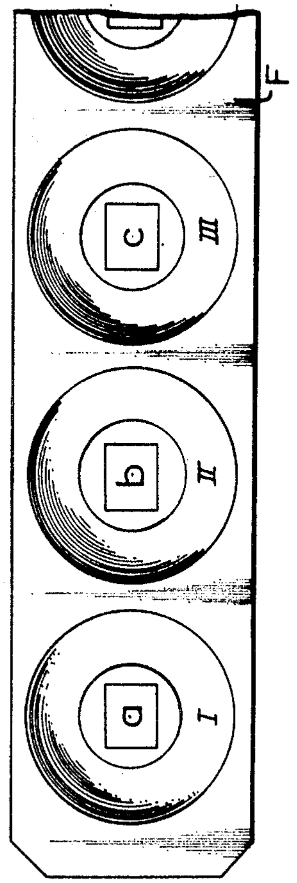
FIG. 1 is a diagram showing, on a support, a series of sound tracks in spiral form and a series of images disposed inside the spirals.
Figure 2:
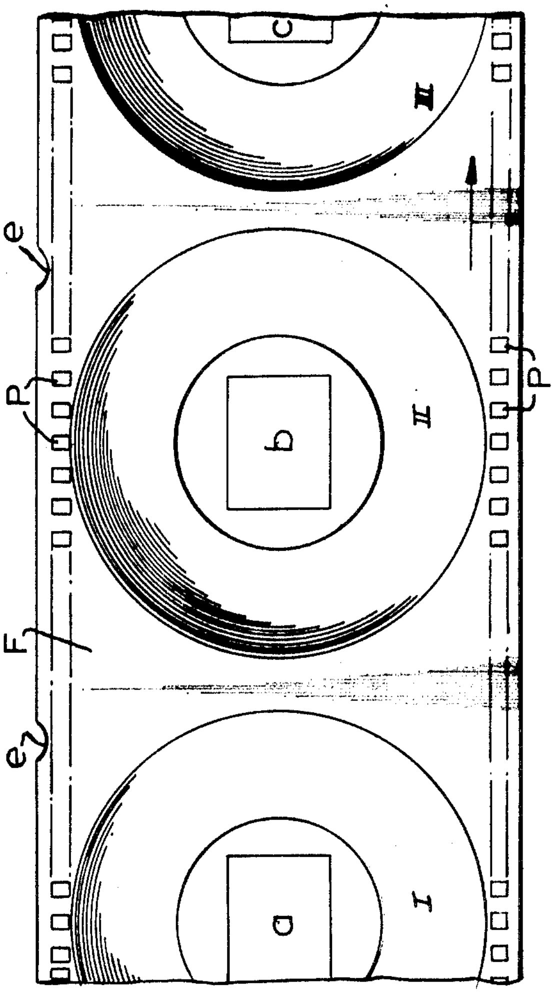
FIG. 2 shows, in greater detail and on a larger scale, a similar support.

In the embodiments shown in FIGS. 1 and 2, a film or support F has a series of sound tracks in spiral form in rings I, II, III and a series of images *a*, *b*, *c* disposed inside said rings.

The commentary or sound track is on ring I, for example, and the photograph or image which corresponds thereto is placed inside a ring which follows or precedes it: at "*b*" for example. Of course, there may be a greater shift between the two.

The film F comprises perforations "*p*" to feed or position it.

Recording is carried out according to an optical method. The track is a converging Archimedean spiral. Its starting point is always situated at the same point on the film and its length is a function of the recording time.

Of course, the spiral may be diverging.

According to one embodiment the photographic film employed is a black and white or color film of 2.8 inch according to the results to be obtained upon projection. This film comprises perforations on either side of the film, at a pitch of 0.2 inch. The maximum diameter which may be employed on this film is 2.4 inches, which leads to adopting a film displacement pitch corresponding to 14 perforations that is 2.6 inches.

For reasons of sound quality, the minimum diameter of the spiral is around 1.2 in. and the speed of rotation 60 r.p.m.; this rotational speed corresponds approximately to the maximum recording period which may be realized taking into account the resolving power of present films and of the sought after passing band.

In this same embodiment, the pitch of the spiral has been fixed at 0.02 in., that is to say that for one revolution there is an axial displacement of 0.02 inch. Thus, one may obtain 30 seconds of sound.

Sound recording is carried out in fixed and asymmetrical density.

The minimum diameter of the spiral being 1.2 inch, the photograph may have for maximum dimension a circle of a diameter of 1.2 inch.

For ease of projection the center of the photo corresponds to the center of the spiral.

Figures 3, 9:
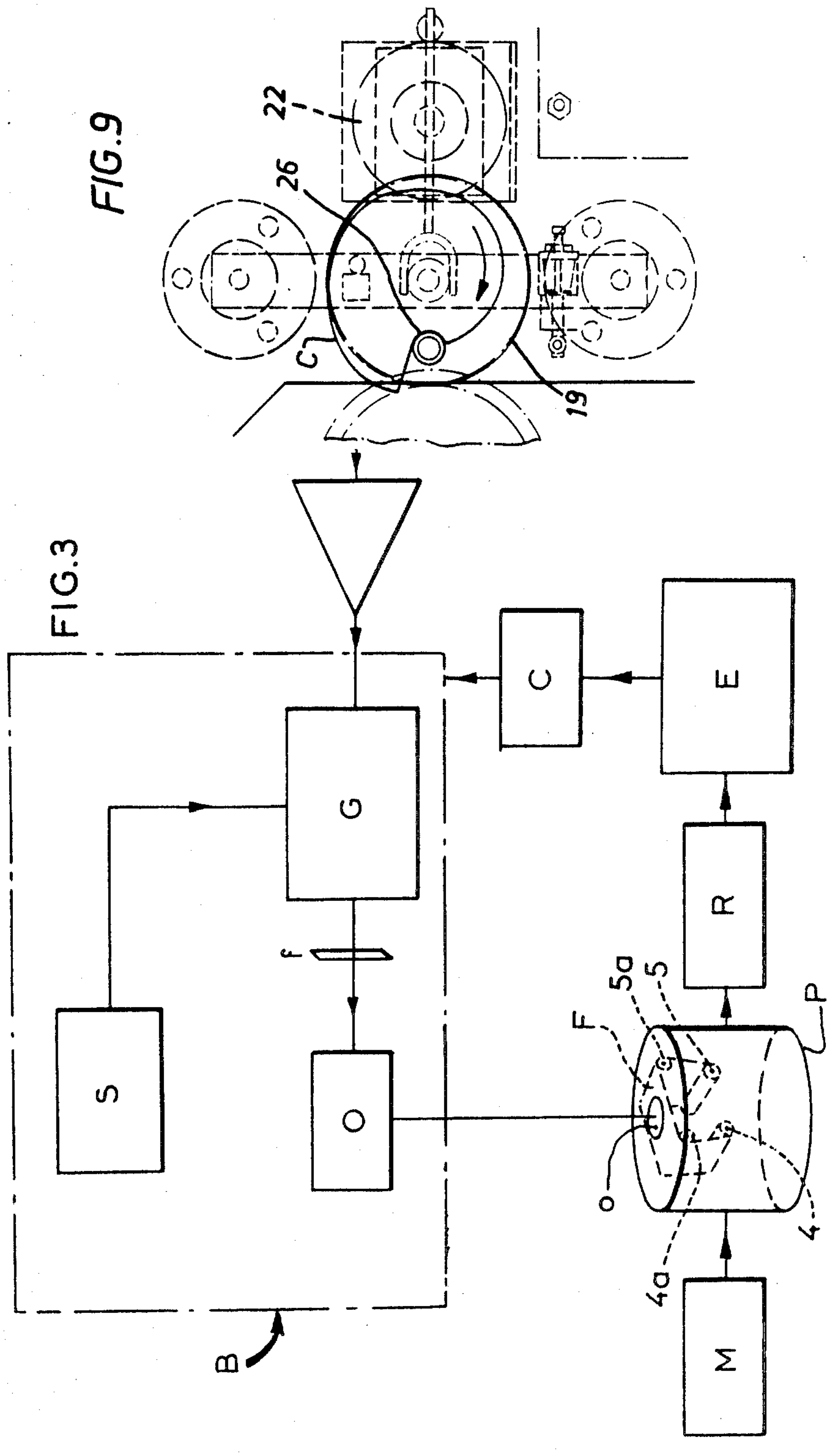
FIG. 3 is a block diagram showing the different elements of a recording apparatus according to the invention.
FIG. 9 shows a detail of a mechanical control device for the recording apparatus.

FIG. 3 shows in the form of a block diagram the various elements of the recording apparatus.

Figure 4:
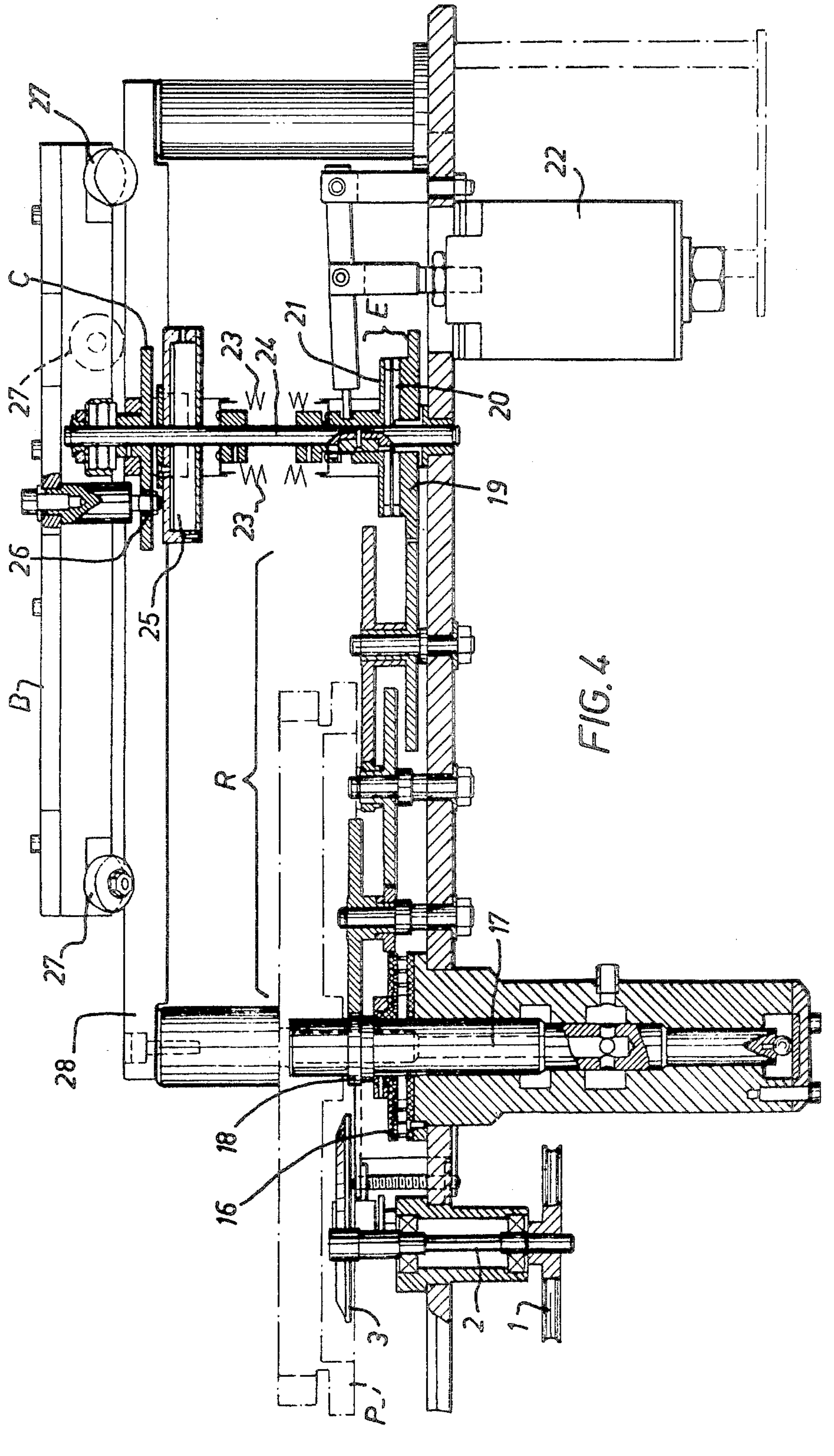
FIG. 4 is a view in elevation and partial section of a recording apparatus according to the invention.

A synchronous motor M drives by means of a pulley wedged on its shaft and a belt, a receiving pulley 1 (FIG. 4) integral with a shaft 2 mounted on a ball bearing which drives a plate P through the agency of a rubber wheel 3. This wheel permits of absorbing the vibrations and lessening the irregularities which may exist on the shaft and the plate itself. The plate rotates at 60 r.p.m.

The speed of rotation of the plate may be controlled by a stroboscopic scale cut in its periphery.

The rotating plate P is a light-tight cylindrical box which comprises only one circular opening "*o*" of a diameter of 2.4 in. opposite which places itself the film to be impressed.

Figure 6:
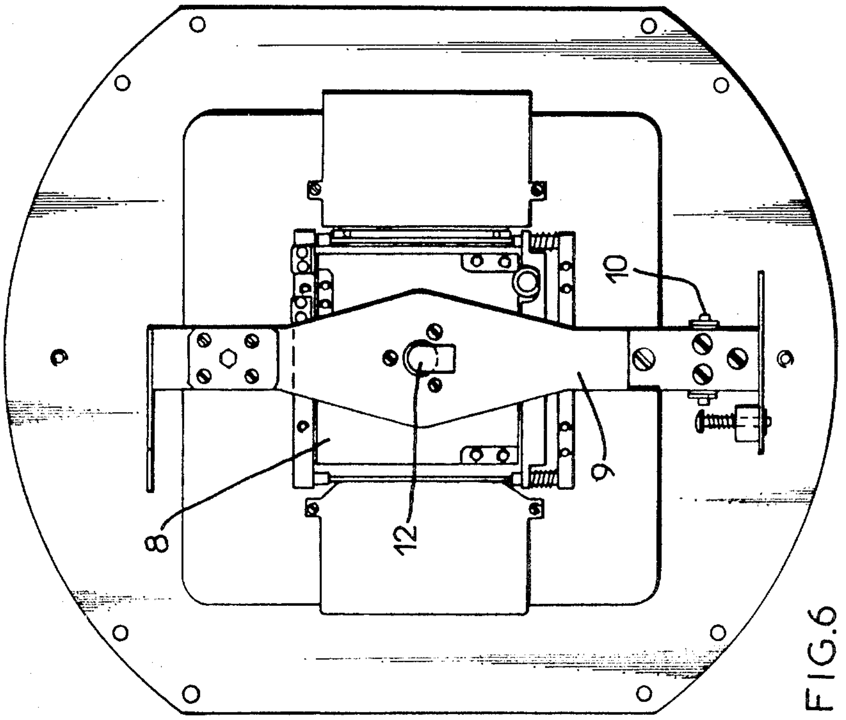
FIG. 6 is a view from below of said upper part of the case.
Figure 5:
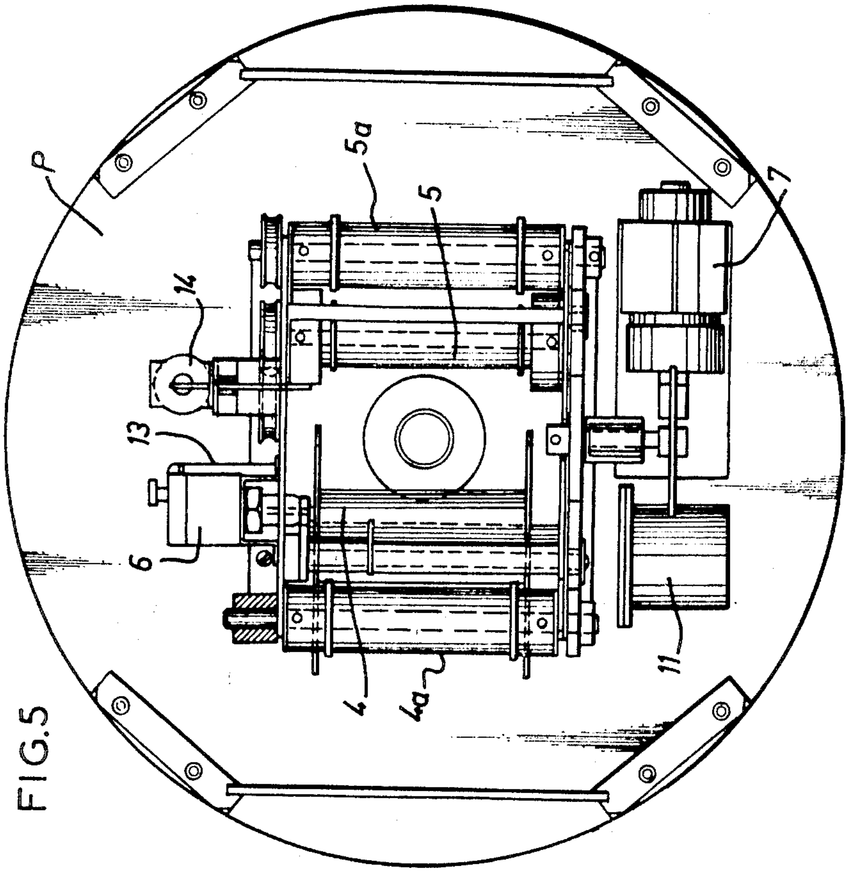
FIG. 5 is a view from above of a light-tight rotary case, deprived of its upper part.
Figure 7:
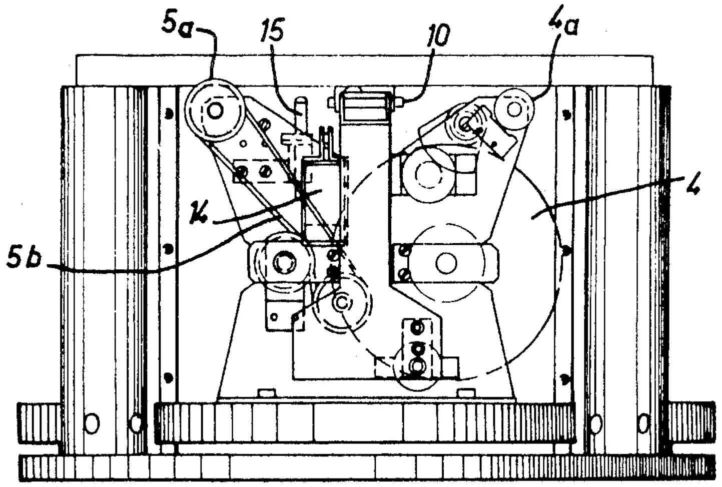
FIGS. 7 and 8 are views in side elevation of the inner arrangements of the rotary tight case.
Figure 8:
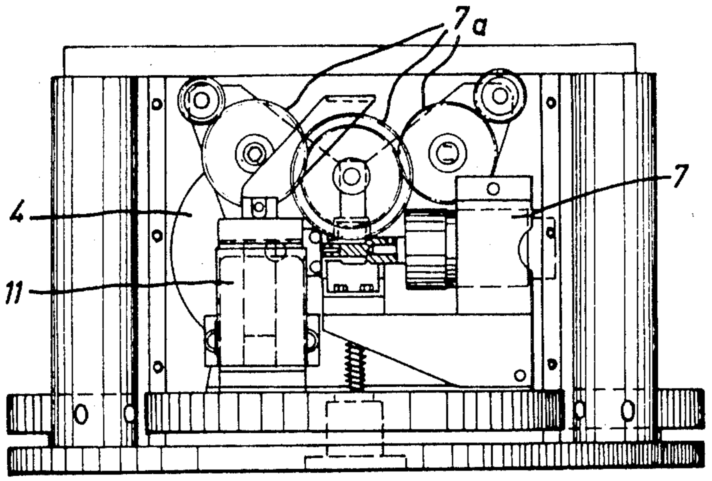

Inside said case-shaped plate one finds the various following elements:

A spool 4 of unexposed film and a spool 5 for the reception of the impressed film:

A device 6 (FIG. 5) permitting of ascertaining at any moment the amount remaining of unexposed film:

A motor 7 and its reducing gear **7*a* (FIG. 8) permitting the step by step feed of the film by means of driving rollers 4*a* and 5*a* (FIG. 7). The receiving spool 5 is itself driven by a belt 5*b* connected to a pulley of the driving roller 5*a***;

A pressing device 8 (FIG. 6) with a control arm 9 and hinge 10 actuated by an electromagnet 11, which permits the film to be perfectly flat during recording. Flatness is increased by air suction 12 produced on the pressing device between the latter and the film. This suction may be eliminated by a valve 13 mounted on the plate. The pressing device, by lowering itself in order to permit the displacement of the film, occasions the opening of the valve;

A catch serving to center the film correctly by penetrating into a perforation:

An electromagnet 14 (FIG. 7) actuating a perforator 15 which makes a notch "*e*" in the film, notch which serves to position the film in the reading device (and to number the views).

In addition to these mechanical elements, there exists under the place *P* a series of rotating contacts 16 (FIG. 4) permitting the feed of the various devices mounted on the same, so as to allow displacement, centering and punching of the film without having to stop the plate. All these operations are carried out automatically.

On the shaft 17 of the plate *P* is cut a pinion 18 which serves to drive a reducing gear *R*. At the exit of said reducing gear a driving disk 19 of a clutch *E* rotates through 1/45th th of a revolution per second, that is to say 1⅓r.p.m.

The clutch is constituted by two disks 20 and 21: the one (20) rotates continuously, driven by the plate *P* by means of the reducing gear *R;* the other (21) undergoes movements of translation to permit declutching and coupling according to requirements. The two disks comprise teeth which carry out the coupling. There are 45 such teeth, regularly spaced every 8°, which permits of coupling each second, since the reduction ratio between the plate and driving disk of the clutch is 45. Thus one may start the rotation of a cam C (FIGS. 4 and 9) on a fixed position relative to the plate P. This permits of starting up the spiral always at the same point on the film.

When one interrupts the feed of an electromagnet 22 controlling the clutch, the disk 21 is recalled by two springs 23 which brings about the disengagement of the clutch.

On the spindle 24 of the movable disk 21 of the clutch, are placed the cam C and its return spring 25; the latter, at the moment of declutching, recalls the cam to its starting point.

The cam C is an Archimedean spiral whose vector radius increases by 0.02 inch every 8° which gives a spiral having a pitch of 0.02 inch on the film since the cam rotates through 8° when the film holding plate has effected one revolution.

On said cam C bears a ball bearing 26 which is connected to a light modulating block B.

This block consists of four main elements:

A luminous source S consisting of a lamp fed in direct current, illuminating a transparent semicircle through an optical device;

A mirror driven by a cord galvanometer G deviating the light by an angle proportional to the instantaneous value of the sound signal to be recorded;

a slot *f*;

A lens O which projects the image of the slot *f* on the film F.

The modulating block B is mounted on ball bearings 27 which run on two rails; one of these rails 28 is prismatic and serves to guide the unit, the other is plane. The block is recalled, after declutching and the return of the cam, by two small springs; this motion is braked by a shock absorber to avoid the shocks which would run the risk of damaging the galvanometer or occasioning the fracture of the lamp filament.

In the embodiment shown, the feed of the modulating block is effected by a cam but, according to a modified form, one may make use of a guide screw provided with a disengageable nut (method employed to engrave the disks) or even an independent motor.

In these embodiments, a film level rotates about itself and the light modulating block follows a radial rectilinear movement.

One may also consider the cases in which:

the film is stationary and the modulator moves along a spiral;

the film and the modulator are stationary and recording is realized by displacement of an optical device (a WOLLASTON prism for example).

Generally speaking, all the sequences of the operation are automatic in order to simplify the recording operations.

The whole recording unit is, preferably enclosed in a light-tight hooding so as to allow the operator to work by day. The sequences of the recording operations may be materialized by luminous sights on a control panel.

The formation of the transparency may be carried out by means of a simple plate photographic apparatus to which has been added a mask giving the dimension of the photo.

A centering system may be provided in order to position accurately the spiral and the photo (catch penetrating into a perforation for example).

To this end one makes use of the notch made by the electromagnet 14 for centering the film, the catch serving only to complete the centering. A contact is established when a finger falls into the hollow of said perforation.

There exist various methods for placing the photo on the film. This depends above all on the moment when it is desired to carry this out and also on the quantity of identical film to be provided.

If a great quantity of film is to be produced, it is advantageous to make a copy through contact from a film of 24 x 36 for example, or to carry out a projection on the film of a photo already reduced by means of an object glass. These are classical methods of duplication.

For the case of a single film, one may adopt the solution of the photographic apparatus and one may also resort to the above-mentioned methods. There is also the possibility of projecting on the film an image of the view, placed on the film through an object glass, directly on the plate of the recording apparatus. This is realizable in two ways: either by stopping the plate in a definite position, or allowing the plate to rotate and illuminating the view by a flash sufficiently rapid so as not to have a "moved" negative on the film, the flash being released at the desired moment by an electronic device controlled by a cell or an electrical contact.

The view projector may be an ordinary transparency projector comprising, preferably, a pressing device sufficiently important to be able to press a film of 2.8 in.

The sound track reader may be considered as being composed of two distinct parts, the one mechanical serving for the creation of the spiral, the other optical serving to reproduce the sound. One has further provided a film feed device and the pressing device for the latter.

Motion is provided by a synchronous motor and the reduction is effected directly by a belt 29 (FIG. 10) passing from a pulley 30 mounted on the shaft of the motor to a plate 31 so as to realize a rotation of 60 r.p.m. of the plate.

On one of the bearings supporting the shaft of the plate, is to be found a toothed fixed wheel which gears with a toothed wheel the spindle of which passes through the plate and drives a bevel gear 32 which causes a guide screw 33 to rotate. This latter has a straight edge so as to ensure the drive on slideways 34 of a carriage W due to a half-nut 35 the profile of which pairs with that of the guide screw.

An electromagnet 36 permits of declutching the guide screw and the carriage is then recalled to the starting position by two springs. The "inoperative" position of the carriage corresponds to the center of the spiral.

The reduction due to the two toothed wheels and to the bevel gear 32 permits the guide screw 33 to make half a revolution when the plate makes one revolution. This screw with a pitch of 0.04 inch thus gives a lead of 0.02 inch per revolution of the plate.

Figure 11:
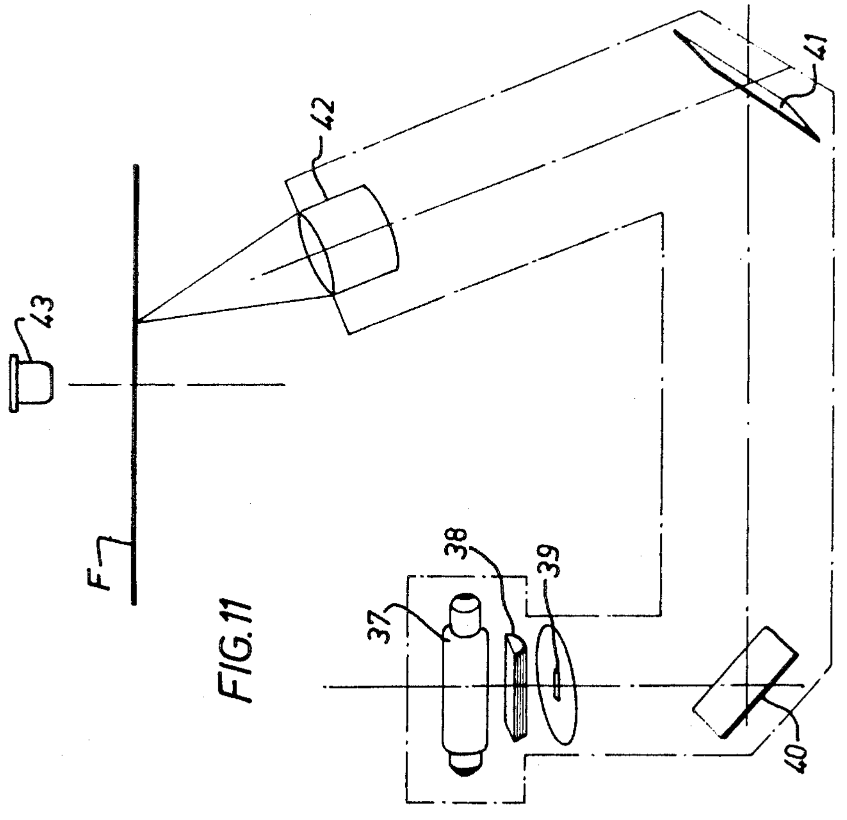

The carriage of the plate 31 supports a device producing the image of a luminous slot on the film. It comprises a lamp 37 with a rectilinear filament (FIG. 11), a cylindrical lens 38, a slot 39, two mirrors 40 and 41 and an object glass 42 consisting of two lenses. The optical axis of the object glass is preferably inclined by 20°30′ relative to the axis of the plate to permit better concentration of the light on a reading cell 43.

The light modulated by the film may be concentrated by an optical device mounted on the cell 45 which is also stationary. The signal received is then amplified in a low frequency amplifier, transistorized or not.

Figure 12:
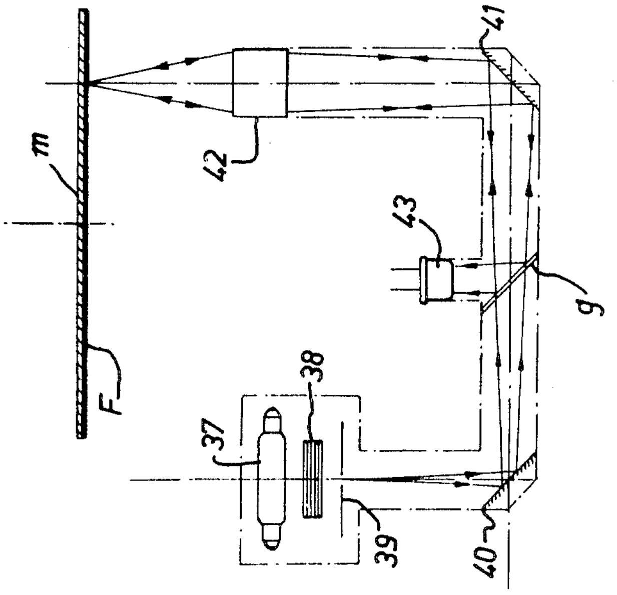
FIGS. 11 and 12 are diagrams showing two embodiments of the optical outfit of the reading apparatus.

It is possible to place the reading cell on the rotary plate by placing a mirror (*m*) on the movable part of the pressing device: this mirror reflects the light which then passes again in the object glass and which may be separated by a plate glass (*g*) which sends it back on to the cell (FIG. 12).

On the spindle of the plate 31 is a pulley which, by means of a belt, drives a spindle 44 (FIG. 13). On this spindle, a friction clutch 45 permits the drive of the film, through a ring 46, preferably in rubber, mounted at the end of a film feed spool 47. This clutch is controlled by two electromagnets 45*a* (FIG. 14): the one for the feed and the other for the recall and which also serve to raise a pressing device from the film 48 (FIG. 15). A ratchet mechanism blocks the film feed notched roller after two revolutions in order satisfactorily to center the film. A centering catch then verifies that the film is in a satisfactory position and thus controls the starting of the reading of the spiral track.

According to another scanning method (FIG. 16) of the spiral the displacement is realized by the combination of the following movements:

a. of a plate 31*a* driven to rotate at constant speed by a synchronous motor and a belt 29*a* acting on the rim of the plate 31*a*.

b. of a radial carriage 49 supported and guided by balls 50 running in parallel grooves 51 made in the plate 31*a* and in the carriage 49 itself. The radial position of the carriage is enforced by an arm 52 carrying a serrated roller 53 which bears on an outline of triangular profile of a spiral gauge 54 made in a guiding plate 55.

In the initial position, the radial displacement carriage 49 occupies the position shown in FIG. 16, that is to say that the luminous beam issuing from the optical device reaches the film at the beginning of the track on the outside (radius 1.2 in.). The guiding serrated roller 53 bears on the spiral gauge 54 on the first whorl near the center. As the plate 31*a* continues to rotate, the serrated roller moves outwardly of the spiral which drives the object glass 42 towards the center up to a radius of 0.6 inch. At that moment a contact carried by the plate 31*a* closes and feeds two electromagnets 56 which has for effect to recall backwards the plate 55 of the spiral gauge 54 thus releasing the serrated roller 53. Centrifugal force and a return spring recall the radial carriage to its initial position at the start of reading with a view to a fresh scanning.

As soon as the electromagnets 56 are no longer excited, a return spring 57 brings the plate 55 back into position by making it resume contact with the serrated roller 53. An adjustable stop prevents the rotation of the guiding plate and permits an accurate adjustment of the starting point of the scanning so as to make it coincide with the spiral of the track carried by the film.

The optical block carried by the radial carriage 31*a* also carries the reading cell 43 and its preamplifier. The cell is placed so as to collect the luminous beam issuing from the optical block reflected by a mirror (*m*) placed behind the recording support or film F. One thus collects the maximum of modulated light.

The advantages of this reading system are the following:

use of a direct guiding by spiral, the mechanical realization of which is particularly simple and economical;

use of a follower cell ensuring the maximum of efficiency and permits of utilizing photosensitive elements of average performance, thus of small cost.

One may further utilize an optical fiber rotating at the same speed to bring back the light on the cell which would then be stationary.

Finally, the focusing of the beam may be obtained by a toric lens.

The luminous source (incandescent lamp) may illuminate the slot 39 through the agency of an optical conduit. The reason for this conduit is to increase the luminous intensity at the level of the slot.

The feed of the film may be realized by a direct current micromotor (in order to have a reversal of running). For the pressing device, one may utilize an electromagnet, but it is possible to carry out this maneuver due to a cam driven by the film feed motor.

Generally speaking, the above description has been given only in an explanatory but by no means limitative manner and various changes in detail may be made therein in conformity with its spirit.

I claim:

1. An apparatus for optical recording on a film a series of images and a series of sound tracks comprising
film-holding means having an opening therein,
light-modulating means aligned with the opening of said film-holding means,
means for effecting the two movements capable of generating a spiral following any law, of said film-holding means and said light-modulating means relative to each other,
and means aligned with said film holding means for optically recording each sound track, which sound track follows a spiral between two concentric circles on the same film with an image, which image is formed inside the smallest circle of said sound track.

2. An apparatus according to claim 1, further including
an intermediate optical device connected to said means for effecting the two movements capable of generating a spiral and affected thereby.

3. An apparatus according to claim 1 wherein:
the means effecting one of the movements capable of generating a spiral are applied to said light modulator,
the means effecting the other movement being applied to the film.

4. An apparatus according to claim 3 wherein:
means effecting a rotary movement about an axis are applied to a plane portion of the film,
means effecting a radial rectilinear movement are applied to said light modulator.

5. An apparatus according to claim 4 comprising:
a light-tight rotary case,
an opening made in said case, the said plane portion of the film being maintained in said case behind said opening.

6. An apparatus according to claim 4 comprising:
a pressing device, the said device maintaining the plane portion of the film in a flattened condition during recording.

7. An apparatus according to claim 6 comprising:
a suction means, the said means creating suction between said pressing device and the film so as to increase the flatness of the film portion.

8. An apparatus according to claim 3 wherein:
means effecting radial rectilinear movement are applied to a plane portion of the film,
means effecting a rotary movement about an axis are applied to said light modulator.

9. An apparatus according to claim 8 comprising:
a controlling means is provided between said means effecting a radial rectilinear movement and said means effecting a rotary movement about an axis.

10 An apparatus according to claim 9 wherein:
the said controlling means is mechanical and includes in particular a cam causing a radial rectilinear movement of said plane portion of the film.

11. An apparatus according to claim 10 wherein:
the profile of said cam is a spiral the vector radius of which varies by an amount corresponding to the pitch of the spiral to be obtained for a given polar angle.

12. An apparatus according to claim 11 comprising:
a clutch device for said cam operatively connected to said cam,
and means for starting rotation of said cam from a predetermined position.

13. An apparatus according to claim 4 comprising:
a controlling means is provided between said means effecting a radial rectilinear movement and said means effecting a rotary movement about an axis.

14. An apparatus according to claim 28 wherein:
the said controlling means is mechanical and includes in particular a cam causing a radial rectilinear movement of said light-modulating means.

15. An apparatus according to claim 14 wherein:
the profile of said cam is a spiral the vector radius of which varies by an amount corresponding to the pitch of the spiral to be obtained for a given polar angle.

16. An apparatus according to claim 30 comprising:
a clutch device for said cam operatively connected to said cam,
and means for starting rotation of said cam from a predetermined position.

UNITED STATES PATENT OFFICE
CERTIFICATE OF CORRECTION

Patent No. 3,599,549 Dated August 17, 1971

Inventor(s) EMILE JEAN DIUZET

It is certified that error appears in the above-identified patent and that said Letters Patent are hereby corrected as shown below:

In column 1, lines 10, 11 and 12, the claims for priority should read as follows:

April 13, 1967, France, 102,658 and April 5, 1968, France, Patent of Addition, 147,249.

Signed and sealed this 21st day of March 1972.

(SEAL)
Attest:

EDWARD M.FLETCHER,JR.
Attesting Officer

ROBERT GOTTSCHALK
Commissioner of Patents